United States Patent
Menze et al.

(10) Patent No.: US 6,206,118 B1
(45) Date of Patent: Mar. 27, 2001

(54) ARTICULATED WORK VEHICLE

(75) Inventors: Adam R. Menze; Thomas G. Lykken, both of Fargo, ND (US); Bryan J. Garberg, Moorhead, MN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/160,669

(22) Filed: Sep. 25, 1998

(51) Int. Cl.$^7$ .................................................. B62D 53/00
(52) U.S. Cl. ........................ 180/14.1; 180/89.3; 280/492
(58) Field of Search ...................... 180/14.1–14.4, 180/14.7, 418–420, 89.13; 280/442, 492, 98, 100

(56) References Cited

U.S. PATENT DOCUMENTS

| | | |
|---|---|---|
| 2,872,993 | 2/1959 | Toth . |
| 3,007,590 | 11/1961 | Mathew et al. . |
| 3,167,147 | 1/1965 | Symons et al. . |
| 3,237,790 | 3/1966 | Kampert et al. . |
| 3,240,284 | 3/1966 | Finneman . |
| 3,246,778 | 4/1966 | Kampert et al. . |
| 3,312,301 | 4/1967 | Hagen . |
| 3,338,329 | 8/1967 | Orth . |
| 3,349,864 | 10/1967 | Wagner . |
| 3,367,437 | 2/1968 | Garrett . |
| 3,451,494 | 6/1969 | Kowalik . |
| 3,701,393 | 10/1972 | Lemons et al. . |
| 3,773,129 | 11/1973 | Anderson . |
| 3,828,882 | 8/1974 | Biskup . |
| 4,019,598 | 4/1977 | Fresmann et al. . |
| 4,043,422 * | 8/1977 | Barrett et al. ...................... 180/418 |
| 4,073,364 | 2/1978 | Schmidt . |
| 4,081,046 | 3/1978 | Stone . |
| 4,310,061 | 1/1982 | Khanna et al. . |
| 4,356,878 | 11/1982 | Kestian et al. . |
| 4,400,896 | 8/1983 | Jeanson . |
| 4,771,851 | 9/1988 | Nystuen et al. . |
| 4,802,545 | 2/1989 | Nystuen et al. . |
| 5,269,389 | 12/1993 | Tomiyoshi et al. . |
| 5,366,337 * | 11/1994 | Eriksson .............................. 414/550 |
| 5,725,063 | 3/1998 | Ceragioli et al. . |
| 6,016,885 * | 1/2000 | Hickman et al. ..................... 180/418 |

* cited by examiner

Primary Examiner—Brian L. Johnson
Assistant Examiner—Matthew Luby
(74) Attorney, Agent, or Firm—Foley & Lardner

(57) ABSTRACT

A work vehicle includes a first section having a first set of ground engaging motive members, a second section having an operator station, and a third section having a second set of ground engaging motive members. The first section is pivotally coupled to the second section about the first pivot axis, while the second section is pivotally coupled to the third section about a second pivot axis. Preferably, the operator station has an arcuate front contour with a radius centered proximate the first pivot axis.

24 Claims, 4 Drawing Sheets

ARTICULATED WORK VEHICLE

FIELD OF THE INVENTION

The present invention relates to articulated work vehicles. In particular, the present invention relates to a double articulated work vehicle that provides an improved turning radius and improved directional perception.

BACKGROUND OF THE INVENTION

In the field of articulated work vehicles, it has long been known to provide a vehicle having a front section and a rear section pivotally connected to one another about a central articulation point or pivot axis, generally at an intermediate location along the longitudinal axis of the vehicle. This central articulation point allows relative angular movement of one section of the vehicle relative to the other about a point to afford tight-radius steering. Articulated work vehicles of this type include farm tractors, crawlers, earth-moving machines, loader back hoes and the like.

Despite the popularity of work vehicles including a central articulation point, such work vehicles still have inherently limited turning or steering radii and are difficult to turn due to misleading directional perceptions provided by the operator station. Such centrally articulated work vehicles are inherently limited in their turning radius because the tires of such vehicles frequently interfere with each other or interfere with the front frame during turning. Such centrally articulated work vehicles are also difficult to precisely control and steer because each of the operator station, the front frame and the tires may simultaneously be oriented at different angles.

As a result, there is a continuing need for an articulated work vehicle having an improved turning or steering radius and providing the driver with a more accurate visual perception of the direction in which the work vehicle is moving during steering.

SUMMARY OF THE INVENTION

The present invention is directed to a work vehicle that includes a first section having a first set of ground engaging motive members, a second section having an operator station and a third section having a second set of ground engaging motive members. The first section and the second section are pivotally coupled to one another about a first articulation or pivot axis. The second section and the third section are pivotally coupled to one another about a second articulation or pivot axis.

The present invention is also directed to a work vehicle including a first section, a second section and a third section. The first section includes a first frame, an engine coupled to the first frame, and a first set of ground engaging motive members coupled to the first frame. The second section includes a second frame pivotally coupled to the first frame, a transmission coupled to the second frame and operatively connected to the engine, and an operator station coupled to the second frame. The third section includes a third frame pivotally coupled to the second frame and a second set of ground engaging motive members coupled to the third frame.

The present invention is also directed to the work vehicle including a first section and a second section. The first section includes a first frame, an engine coupled to the first frame and a first set of ground engaging motive members coupled to the first frame. The second section includes a second frame pivotally coupled to the first frame about a first pivot axis, a transmission coupled to the second frame and operatively connected to the engine and an operator station coupled to the second frame. The operator station has an arcuate front contour having a radius centered approximately at the first pivot axis.

The present invention is also directed to a work vehicle including a first section, a second section and a third section. The first section includes a first set of ground engaging motive members. The second section is pivotally coupled to the first section and includes a transmission. The third section is pivotally coupled to the second section and includes a second set of ground engaging motive members.

DESCRIPTION OF THE DRAWINGS

FIG. 7 is a sectional view of the work vehicle of FIG. 4 taken along lines 7—7.

DETAILED DESCRIPTION OF THE PREFERRED EMBODIMENTS

Figure 1:
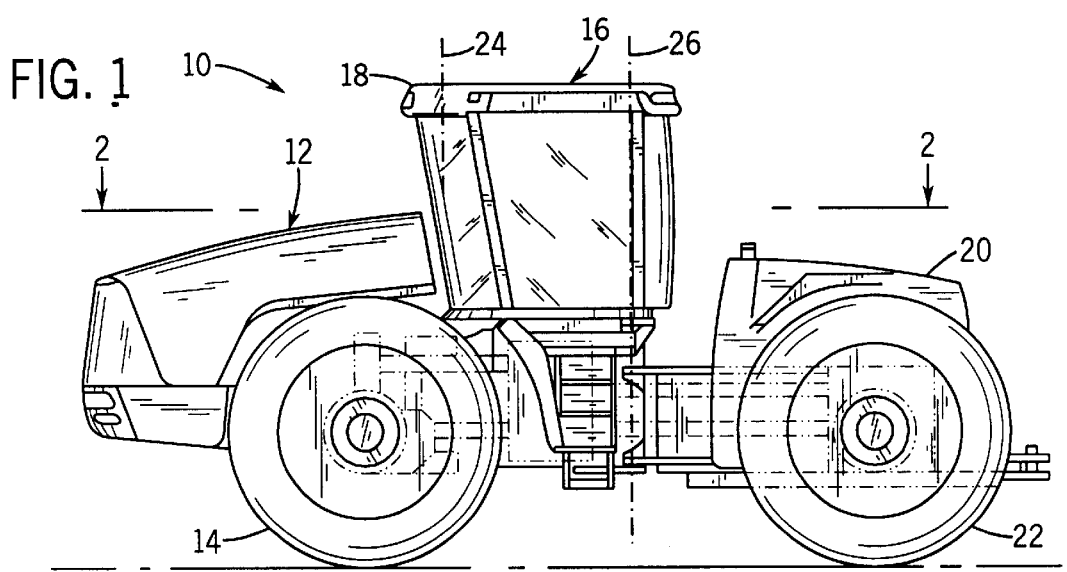
FIG. 1 is a side elevational view of an exemplary work vehicle of the present invention.

FIG. 1 is a side elevational view of a work vehicle 10, preferably comprising an agricultural tractor. Work vehicle 10 generally includes a front section 12 having a first set of ground engaging members 14, an intermediate section 16, which includes an operator station 18 and a rear section 20, which includes a second set of ground engaging motive members 22. Sections 12 and 20 are each pivotally coupled to section 16 for articulation about axes 24 and 26, respectively. Since front section 12 moves with ground engaging motive members 14, interference between the front section and its ground engaging motive members 14 is eliminated. Because articulation axis 24 is located behind ground engaging motive members 14, ground engaging motive members 14 move less relative to intermediate section 16 which allows intermediate section 16 to be wider and which provides for greater turning before interference between the ground engaging motive members 14 and intermediate section 16. Because middle section 16 includes operator station 18, middle section 16 can be elongated without increasing the overall length or mass of work vehicle 10. Because middle section 16 is longer, front section 12 and rear section 20 may be articulated to a greater degree without ground engaging motive members 14 and 22 interfering with one another or with middle section 16. As a result, work vehicle 10 has a tighter steering radius and provides the operator situated at operator station 18 with a more accurate visual perception of the direction in which work vehicle 10 is moving.

Figure 2:
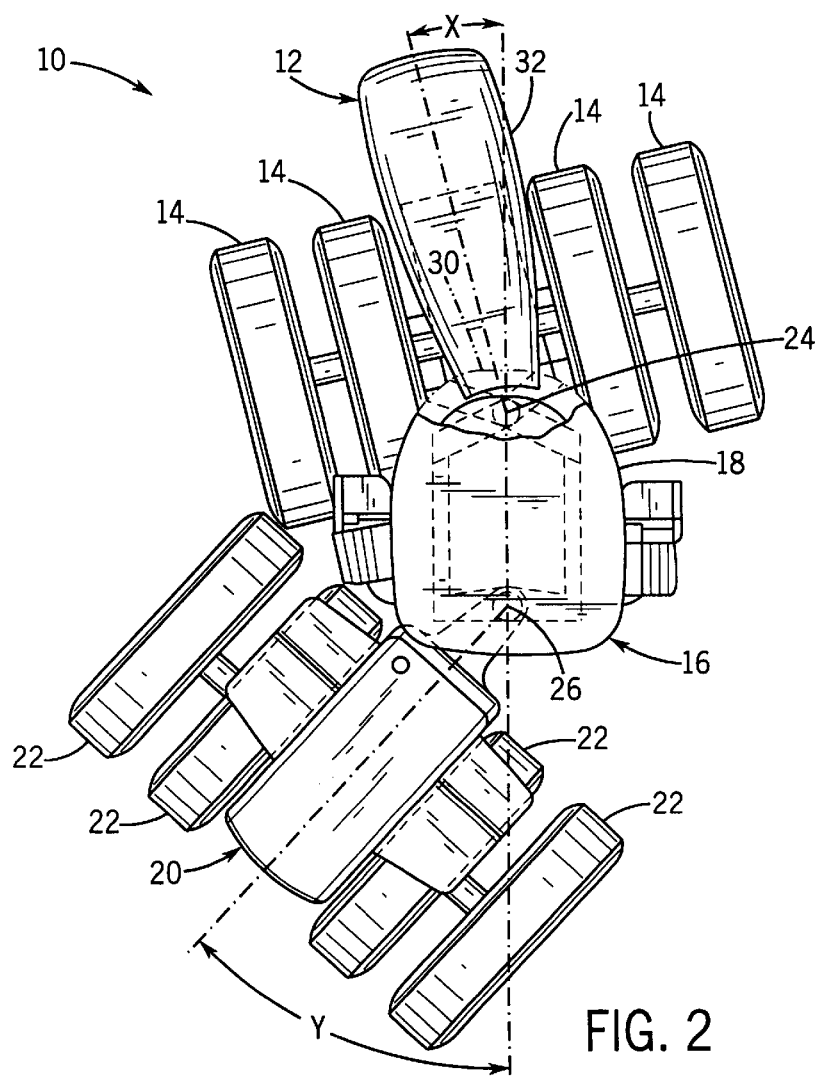
FIG. 2 is a sectional view of the work vehicle of FIG. 1 taken along lines 2—2.

FIG. 2 is a sectional view of work vehicle 10 in an articulated position. As best shown by FIG. 2, operator station 18 preferably comprises a cab having a front substantially arcuate contour 30 having a radius centered proximate axis 24. Front section 12 includes a hood 32 and follows contour 30 of driver station 18 during rotation or articulation of sections 12 and 16 relative to one another.

Because front section 12 turns with the ground engaging motive members 14, front section 12 acts as a pointer. In particular, when work vehicle 10 is driven between crop rows or is being turned, the center line of hood 32 indicates the direction in which work vehicle 10 is traveling. As a result, work vehicle 10 provides the operator seated at the operator station 18 with a more accurate visual perception of the direction in which work vehicle 10 is traveling. Although operator station 18 is illustrated as preferably including a cab, operator station 18 may alternatively include a platform or frame supporting an open-air seat or a seat surrounded by a conventionally known roll-bar or other protective surrounding structure. As will be appreciated, the exact size and configuration of operator station 18 will vary depending upon the type of work vehicle in which the operator station is employed.

As further shown by FIG. 2, section 12 articulates about axis 24 by X-degrees while section 20 articulates about axis 26 by Y-degrees. In the exemplary embodiment illustrated, section 12 articulates about axis 24 up to approximately 14 degrees to either side of the longitudinal center line of work vehicle 10. Section 20 preferably rotates or articulates about axis 26 up to approximately 42 degrees. As will be appreciated, the exact degree of available articulation between sections 12, 16 and 20 may be varied depending upon the dimensions and required turning radii for work vehicle 10.

Figure 3:
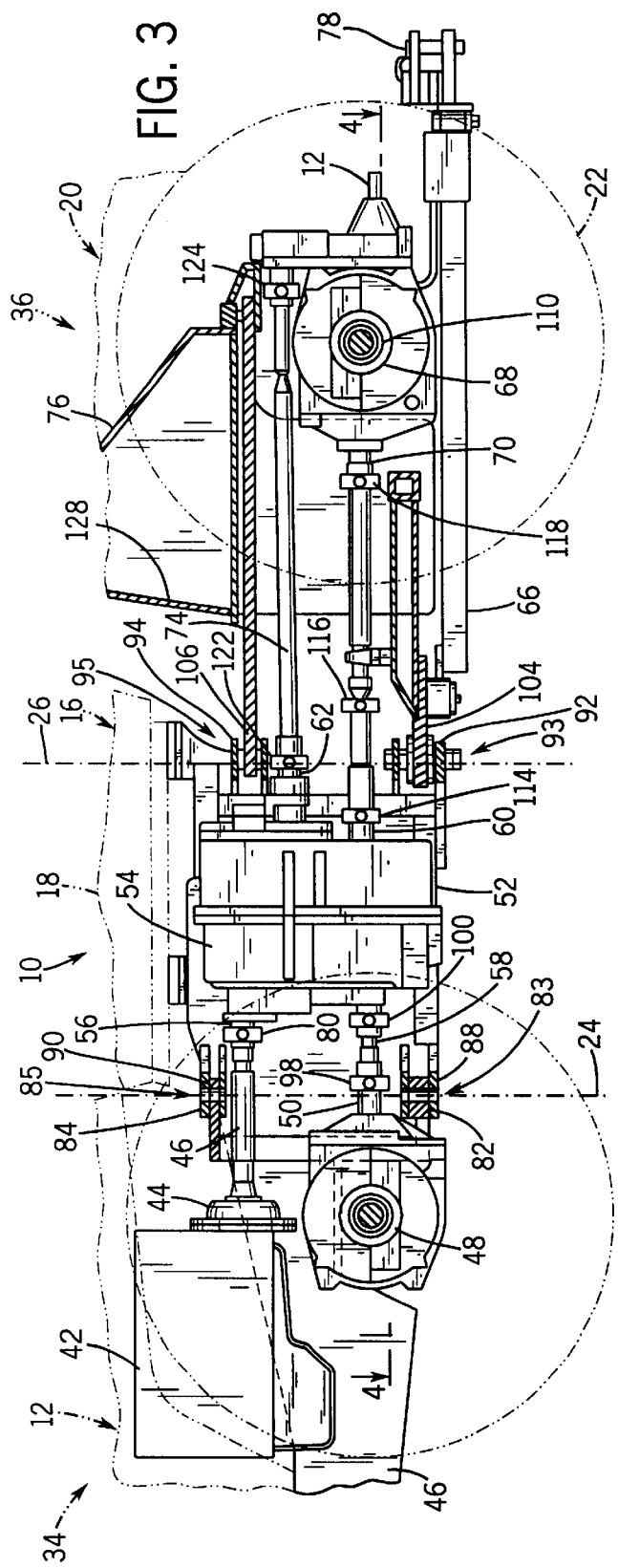
FIG. 3 is a sectional view of the work vehicle of FIG. 1.

FIG. 3 is a sectional view of work vehicle 10 illustrating sections 12, 16 and 20 in greater detail. As best shown by FIG. 3, section 12 is located at a forward end 34 of work vehicle 10 while section 20 is located at a rear end 36 of work vehicle 10. Section 16 is located between sections 12 and 20. Section 12 generally includes frame 40, engine 42, engine coupler 44, engine drive shaft 46, front axle assembly 48, ground engaging motive members 14 and axle input shaft 50. Section 16 generally includes frame 52, transmission 54, transmission input shaft 56, front transmission output shaft 58, rear transmission output shaft 60 and rear power take-off output shaft 62. Section 20 generally includes frame 66, axle assembly 68, axle assembly input shaft 70, power take-off shaft 72, power take-off input shaft 74, fuel storage tank 76 and hitch assembly 78. Frame 40 of front section 12 is a generally elongate rigid base, frame work or structure, either integrally formed or formed from several components mounted to one another so as to support engine 42 and front axle assembly 48. Depending upon the size and shape of engine 42 and axle assembly 48, frame 40 may have various sizes, shapes and configurations. Frame 40 includes interface portions 82 and 84, which cooperate with corresponding interface portions of frame 52 of section 16 to pivotally couple sections 12 and 16 to one another at joints 83 and 85 about articulation axis 24.

Engine 42 comprises a conventionally known engine supported in section 12 by frame 40. Engine 42 drives ground engaging motive members 14 and 22 as well as power take-off shaft 72 via transmission 54. Engine 42 is operatively coupled to transmission 54 by engine coupler 44 and drive shaft 46.

Engine coupler 44 couples engine 42 to drive shaft 46 utilizing a U-joint. The coupler 44 preferably includes a rubber dampener connecting the U-joint to engine 42 to reduce vibration. Engine coupler 44 is coupled to drive shaft 46 which is in turn coupled to input shaft 56 of transmission 54 by yoke 80. Yoke 80 preferably comprises a universal-type coupling which permits transmission of power from drive shaft 46 to input shaft 56 while allowing for changes in angular orientation of drive shaft 46 as yoke 80 is articulated about axis 24. Drive shaft 46 preferably comprises a pair of tubular members telescopingly assembled to permit slight changes in length as section 12 articulates or pivots about axis 24 relative to section 16.

Axle assembly 48 extends from opposite sides of frame 40 to support ground engaging motive members 14 such that ground engaging motive members 14 support frame 40 above the ground being worked. Axle assembly 48 preferably includes a generally known drive train (not shown) for receiving power from transmission 54 via front output shaft 58 and axle input shaft 50. As a result, axle assembly 48 rotatably drives ground engaging motive members 14 to move work vehicle 10. In the exemplary embodiment illustrated, ground engaging motive members 14 and 22 comprise conventionally known tires. As will be appreciated, ground engaging motive members 14 and 22 may be replaced with other mechanisms for moving work vehicle 10 across the ground being worked. For example, ground engaging motive members 14 and 22 may alternatively comprise ground engaging continuous tracks or belts which reduce compaction of the surface being worked.

Similar to frame 40, frame 52 of section 16 comprises an elongate rigid base, framework or structure. Frame 52 is specifically configured to support transmission 54 and operator station 18. Frame 52 may have various sizes, shapes and configurations depending upon the type and size of the transmission, as well as the operator station supported by frame 52. Frame 52 includes front interface portions 88, 90 and rear interface portions 92, 94. Interface portion 88 and 90 cooperate with interface portions 82 and 84 of frame 40, respectively, to pivotally connect sections 12 and 16 to one another at joints 83 and 85 about articulation axis 24. Interface portions 92 and 94 cooperate with corresponding interface portions of frame 66 of rear section 20 to pivotally connect sections 16 and 20 at joints 93 and 95 about articulation axis 26.

Transmission 54 comprises a conventionally known transmission for transmitting power from engine 42 to axle assemblies 48 and 68 as well as to power take-off shaft 72. Transmission 54 is supported by frame 52 in middle section 16 and is controlled via manual and electronic controls situated at operator station 18 and connected to transmission 54. Transmission 54 transmits power to axle assembly 48 via front output shaft 58 which is in turn coupled to axle assembly input shaft 50. Output shaft 58 includes two universal-type yokes or joints 98, 100 which permit transmission of power while allowing for changes in angular orientation of output shaft 58 as sections 12 and 16 articulate relative to one another. Output shaft 58 preferably comprises a pair of tubular members telescopingly assembled to permit slight changes in length during articulation of sections 12 and 16.

Transmission 54 transmits power to axle assembly 68 via rear output shaft 60 and axle input shaft 70. Transmission 54 further transmits power to power take-off shaft 72 via output shaft 62 and power take-off shaft 74.

Frame 66 of rear section 20 comprises a rigid base, framework or structure, configured to support axle assembly 68 and ground engaging motive members 22. In addition, frame 66 supports power take-off shaft 72, fuel tank 76 and implement hitch 78. As will be appreciated, frame 66 may have a variety of different sizes and configurations depending upon the type of ground engaging motive members 22 employed and the size and configuration of such options as the power take-off shaft, the fuel tank or the exemplary implement hitch as illustrated. Although not shown, rear section 20 additionally includes a generally known three point hitch and an auxiliary remote hydraulic power supply system, which are supported by frame 66. Frame 66 includes interface portions 104 and 106. Interface portions 104 and 106 cooperate with interface portions 92 and 94, respectively, of middle section 16 to pivotally connect sections 16 and 20 at joints 93 and 95 for articulation about articulation axis 26. In the exemplary embodiment illustrated, interface portion 106 of frame 66 comprises a separate structure which is fixedly connected to the remainder of frame 66. Alternatively, interface portion 106 may be integrally formed as part of frame 66.

Axle assembly 68 extends across opposite sides of rear section 20 and rotatably supports ground engaging motive members 22 such that ground engaging motive members 22 support rear section 20 above the ground of the surface being worked. Axle assembly 68 includes an axle 110 and a generally known axle drive train (not shown). The axle drive train receives power from transmission 54 via input shaft 70 to rotatably drive ground engaging motive members 22. Input shaft 70 extends from transmission output shaft 60 to axle assembly 68. Input shaft 70 includes a plurality of universal-type yoke or couplers 114, 116, 118, which permit transmission of power from transmission 54 to axle assembly 68 while allowing for changes in angular orientation of shaft 70 as sections 16 and 20 articulate relative to one another about articulation axis 26.

Power take-off shaft 72 extends from rear end 36 of rear section 20 and is configured for being coupled to implements being pulled by work vehicle 10 to power such implements. Power take-off shaft 72 receives power from transmission 54 via power take-off input shaft 74. Power take-off input shaft 74 includes universal-type yoke or couplers 122 and 124 which permit transmission of power from transmission 54 to power take-off shaft 72 while allowing for changes in angular orientation of input shaft 74 as sections 16 and 20 articulate or pivot relative to one another about axis 26.

Fuel storage tank 76 is conventionally known and is supported by frame 66 in rear section 20. Fuel storage tank 76 includes an internal volume 128 which contains fuel for powering engine 42. Because fuel storage tank 76 is supported in rear section 20, fuel storage tank 76 provides necessary ballast over ground engaging motive members 22 to equally distribute the load across work vehicle 10. Alternatively, fuel storage tank 76 may be supported in front section 12 or intermediate section 16.

Implement hitch 78 comprises a conventionally known hitch assembly supported by frame 66 at rear 36 or work vehicle 10. Hitch assembly 78 is configured for being coupled to a draw bar or other structure extending from the implement to be pulled by work vehicle 10. As will be appreciated, hitch assembly 78 may comprise any one of a variety of well-known structures configured for coupling work vehicle 10 to an associated implement.

Figure 4:
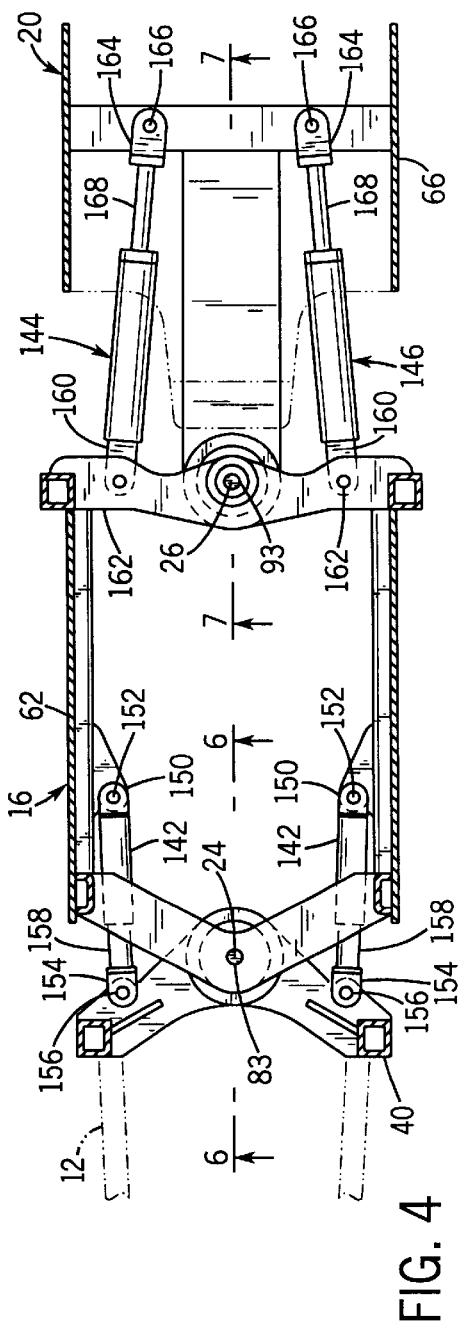
FIG. 4 is a sectional view of the work vehicle of FIG. 3 taken along lines 4—4.
Figure 5:
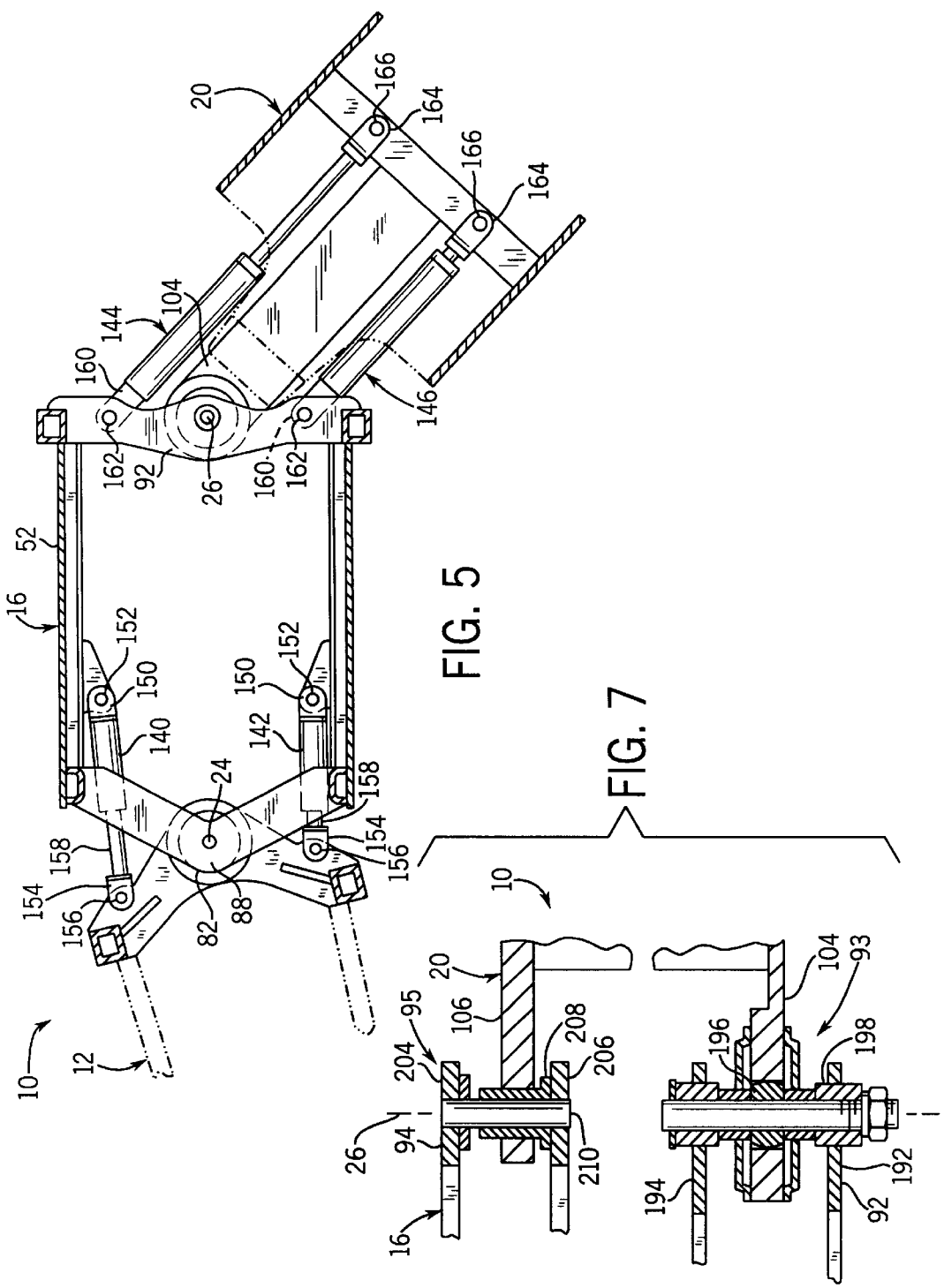
FIG. 5 is a sectional view of the work vehicle of FIG. 4 in an articulated position.

FIGS. 4 and 5 illustrate articulation of sections 12, 16 and 20 in greater detail. FIG. 4 is a sectional view of work vehicle 10 with sections 12, 16 and 20 extending generally along a single axis. FIG. 5 is a sectional view of work vehicle 10 with sections 12, 16 and 20 each pivoted or articulated relative to one another. As best shown by FIG. 4, work vehicle 10 additionally includes steering actuators 140, 142, 144 and 146. Actuators 140, 142, 144 and 146 are preferably coupled to frames 40, 52 and 66 below the other elements of work vehicle 10 interconnecting sections 12, 16 and 20, such as the shafts interconnecting engine 42, transmission 54, axle assemblies 48 and 68 and power take-off shaft 72. Actuators 140 and 142 are operatively connected to operator station 18. Actuators 140 and 142 articulate sections 12 and 16 relative to one another about articulation axis 24. Actuators 140 and 142 are each connected between frames 40 and 52 of sections 12 and 16, respectively. In the exemplary embodiment, actuators 140 and 142 have first clevis ends 150 pivotally mounted to opposing sides of frame 52 by clevis pins 152 and second opposite clevis ends 154 pivotally coupled to frame 40 on opposite sides of axis 24 by clevis pins 156. Actuators 140, 142, 144 and 146 preferably comprise linear actuators having a piston or rod 158. Actuators 140 and 142 are fluidly coupled to a steering hydraulic system (not shown) which may be of a generally known design, and, in operation, receives pressurized fluid causing extension and retraction of rods 158 forcing rotation of sections 12 and 16 about axis 24 as shown in FIG. 5.

Steering actuators 144 and 146 are similar to actuators 140 and 142 and include clevis ends 160 pivotally connected to frame 52 on opposite sides of axis 26 by clevis pins 162 and second opposite clevis ends 164 pivotally coupled to frame 66 of section 20 by a clevis pins 166. Actuators 144, 146 preferably comprise linear actuators having a piston or rod 168. Actuators 144, 146 preferably comprise hydraulic cylinders. Actuators 144, 146 are fluidly coupled to a hydraulic steering system (not shown), which is of a generally known design and which is controlled via controls at operator station 18. In operation, actuators 144 and 146 receive pressurized fluid causing extension and retraction of rods 168 forcing rotation of sections 16 and 20 relative to one another about articulation axis 26.

Although steering actuators 140, 142, 144 and 146 are illustrated as clevis mounted hydraulic actuators, actuators 140, 142, 144 and 146 may alternatively comprise other linear or rotational actuators and may be mounted to the frames or other elements of sections 12, 16 and 20 by other well-known means. For example, actuators 140, 142, 144 and 146 may comprise trunnion mounted actuators such as those shown and described in Ceragioli, et al. (U.S. Pat. No. 5,725,063), which issued on Mar. 10, 1998, and which is assigned to Case Corporation, the full disclosure of which is hereby incorporated by reference.

Figure 6:
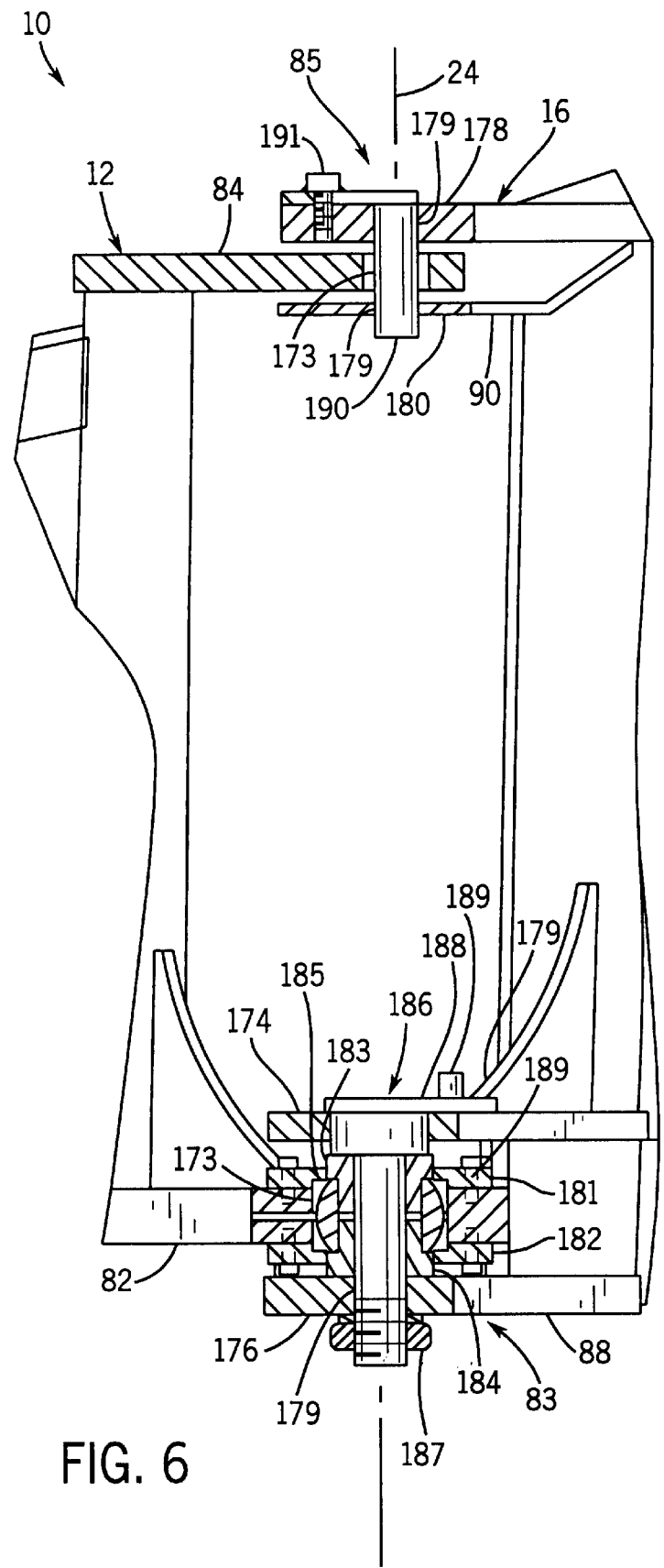
FIG. 6 is a sectional view of the work vehicle of FIG. 4 taken along lines 6—6.

FIGS. 6 and 7 are sectional views illustrating joints 83, 85, 93 and 95 pivotally connecting interface portions 82, 84 of section 12, interface portions 88, 90, 92 and 94 of section 16 and interface portions 104, 106 of section 20. As best shown by FIG. 6, interface portions 82 and 84 each comprise a tang or tongue-shaped member having a bore 173 while interface portions 88 and 90 each preferably comprise upper and lower brackets 174, 176, 178 and 180 which receive interface portions 82 and 84 therebetween and which include aligned bores 181. As further shown by FIG. 6, joint 83 includes upper and lower retaining plates 179, 182, upper and lower bushings 183, 184, spherical bearing 185, pivot pin 186 and nut 187. Upper and lower retaining plates 181 and 182 extend about bore 173 and are bolted to interface portion 82 by bolts 189. Upper and lower bushing members 183, 184 extend within bore 173 opposite upper and lower retaining plates 181 and 182. Upper and lower bushing members 183, 184 and upper and lower retaining plates 181, 182 house and retain spherical bearing 185 therebetween. Pivot pin 186 extends through aligned bores 181 of brackets 174 and 176 and through upper and lower bushings 183 and 184. Pivot pin 186 includes a flag 188 axially extending therefrom which engages button 189. Button 189 extends from upper bracket 174 and prevents rotation of pin 186 as nut 187 is threaded to pin 186. Nut 187 threadably receives pin 186 to clamp and compress brackets 174 and 176 towards one another.

Joint 85 includes pivot pin 190 and pin 191. Pivot pin 190 extends through aligned bores 181 of upper and lower brackets 178, 180 and through bore 173 of interface portion 184 to pivotally connect interface portions 84 and 90 along axis 24. Pivot pin 190 includes a flag which is pinned to upper bracket 178 by pin 191 to prevent rotation of pin 190.

Joints 83 and 85 reliably connect sections 12 and 16 for rotation about axis 24. Because interface portion 84 is not sandwiched in close tolerance between upper and lower brackets 178 and 180, most, if not all, vertical loading occurs across joint 83. Consequently, undesirable pinching between joints 83 and 85 is avoided. As a result, only fore and aft loading occurs across joint 85. Moreover, joint 85 is more easily manufactured without high tolerance concerns.

As best shown by FIG. 7, interface portion 92 includes a pair of vertically spaced brackets 192, 194 configured to receive interface portion 104 therebetween. Interface portion 104 comprises a tang- or tongue-shaped member extending between brackets 192 and 194. As further shown by FIG. 7, joint 93 includes a journal 196 and a pivot pin 198. Journal 196 is located between brackets 192 and 194 and receives pivot pin 198. Pivot pin 198 extends between brackets 192 and 194 and through journal 196 to pivotally couple interface portion 92 to interface portion 104 about axis 26. Pivot pin 198 preferably comprises a bolt which is threaded to a nut to maintain brackets 192 and 194 in compression.

Similar to interface portion 92, interface portion 94 includes lower and upper brackets 204 and 206 which are vertically spaced to receive interface portion 106. Interface portion 106 comprises an elongate tang- or tongue-shaped member extending between brackets 204 and 206. As further shown by FIG. 7, joint 95 additionally includes journal 208 and pivot pin 210. Journal 208 extends between brackets 204 and 206 and through interface portion 106. Journal 208 receives pivot pin 210. Pivot pin 210 extends between brackets 204 and 206 and through journal 208 to pivotally couple interface portion 94 to interface portion 106 about axis 26.

Joints 93 and 95 reliably connect sections 16 and 20 for rotation about axis 26. Due to its configuration, most, if not all, vertical loading occurs across joint 93. Only fore and aft loading occurs across joint 95. As a result, undesirable pinching between joints 93 and 95 is avoided. Moreover, joint 95 may be more easily manufactured without high tolerance requirements.

Although joints 83, 85, 93, 95 and interface portions 82, 84, 92 and 94 are illustrated as lower and upper brackets pivotally connected to an intermediate tang or tongue, joint 83, 85, 93, 95 and interface portions 82, 84, 92 and 94 may have various other structures without departing from the intended scope of the appended claims. For example, in lieu of interface portions 88 and 90 and interface portions 92 and 94 including vertically spaced brackets, interface portions 88, 90, 92 and 94 may include clevis-type members. In addition, the arrangement of the vertically spaced brackets and the intervening tongue members may be reversed. Furthermore, as will be appreciated to those skilled in the art, each joint is also provided with grease fittings and seals (not shown) for protecting the bearing arrangements from excessive wear and deterioration.

Overall, work vehicle 10 provides an improved turning or steering radius and further provides the operator or driver with a more accurate visual perception of the direction in which work vehicle 10 is moving during steering. Because operator station 18 is located in middle section 16, front section 12 serves as a pointer indicating the direction in which work vehicle 10 is moving. Because work vehicle 10 includes two articulation axes 24, 24, work vehicle 10 can be turned with a tighter turning radius without experiencing interference between its ground engaging motive members 14, 22 and its body or frame 40, 52, 66. Moreover, because front section 12 includes the engine and ground engaging motive members 14, because middle section 16 includes the operator station 18 and because rear section 20 includes fuel storage tank 76 and ground engaging motive members 22, the loads placed across frames 40, 52, 66 and the joints interconnecting sections 12, 16 and 20 are more uniformly distributed.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the free volume provided for allowing the steering actuators to pivot could be provided at any level of the vehicle and is not restricted to an open area at the bottom of the frame. Furthermore, the steering actuators could be mounted in reversed direction, i.e., with the actuator barrel coupled to the rear frame and the piston rod coupled to the front frame. Moreover, the term "trunnion" is intended to refer to pivotal supports of any type that may support the actuators, other than pivotal supports located at the cap end of the actuators, such as clevis or tang mounts. While such trunnions are typically mounted in a position intermediate the cap and rod ends of the actuators, they may be located adjacent to the rod end or at various locations along the actuator barrel.

What is claimed is:

1. A work vehicle comprising:
   a first section including a first set of ground engaging motive members;
   a second section pivotally coupled to the first section and including an operator station; and
   a third section pivotally coupled to the second section and including a second set of ground engaging motive members.

2. The work vehicle of claim 1, including an actuator coupled between the first and second sections to articulate the first and second sections relative to one another.

3. The work vehicle of claim 1, including an actuator coupled between the second and third sections to articulate the second and third sections relative to one another.

4. The work vehicle of claim 1, including:
   a first actuator coupled between the first and second sections to articulate the first and second sections relative to one another; and
   a second actuator coupled between the second and third sections to articulate the second and third sections relative to one another.

5. The work vehicle of claim 1, wherein the first section includes an engine.

6. The work vehicle of claim 1, wherein the second section includes a transmission.

7. The work vehicle of claim 1, wherein the first section includes an engine and wherein the second section includes a transmission operatively coupled to the engine.

8. The work vehicle of claim 1, wherein the third section includes a fuel tank.

9. The work vehicle of claim 1, wherein the operator station has a front portion proximate the first section and wherein the second section is pivotally coupled to the first section beneath the front portion.

10. The work vehicle of claim 1, wherein the operator station has a rear portion proximate the third section and wherein the third section is pivotally coupled to the second section behind the rear portion.

11. The work vehicle of claim 1, wherein the first and second sections are pivotally coupled to one another between the first and second sets of ground engaging motive members.

12. The work vehicle of claim 1, wherein the second and third sections are pivotally coupled to one another between the first and second sets of ground engaging motive members.

13. The work vehicle of claim 1, wherein at least one of the first and second ground engaging motive members includes a transverse axle and a plurality of wheels coupled to the axle.

14. The work vehicle of claim 1, wherein the first section is pivotally coupled to the second section about a pivot point and wherein the operator station has an arcuate front contour having a radius centered proximate the pivot point.

15. The work vehicle of claim 1, wherein the first section includes a first frame coupled to the first set of ground engaging motive members, wherein the second section includes a second frame pivotally coupled to the first frame and supporting the operator station, and wherein the third section includes a third frame pivotally coupled to the second frame and further coupled to the second set of ground engaging motive members.

16. The work vehicle of claim 1, wherein the first and second sections are pivotally coupled to one another about first and second vertically spaced pivot joints.

17. The work vehicle of claim 1, wherein the second and third sections are pivotally coupled to one another about first and second vertically spaced pivot joints.

18. The work vehicle of claim 1, wherein the second section is elevated above ground solely by the first set of ground-engaging motive members and the second set of ground-engaging members so as to bridge between the first section and the third section.

19. A work vehicle comprising:
   a first section including:
      a first frame;
      an engine coupled to the first frame; and
      a first set of ground engaging motive members coupled to the frame;
   a second section including:
      a second frame pivotally coupled to the first frame;
      a transmission coupled to the second frame and operatively coupled to the engine; and
      an operator station coupled to the second frame; and
   third section including:
      a third frame pivotally coupled to the second frame; and
      a second set of ground engaging motive members coupled to the third frame.

20. The work vehicle of claim 19, including a fuel tank coupled to the third frame.

21. The work vehicle of claim 19, wherein the second frame bridges between the first section and third section.

22. A work vehicle comprising:
   a first section including:
      a first frame;
      an engine coupled to the first frame; and
      a first set of ground engaging motive members coupled to the first frame; and
   a second section including:
      a second frame pivotally coupled to the first frame about a first pivot axis;
      a transmission coupled to the second frame and operatively connected to the engine; and
      an operator station coupled to the second frame, wherein the operator station has a cab having an arcuate front contour with a radius centered proximate the pivot axis such that the first pivot axis extends through the cab and such that rotation of the first section follows the front contour of the cab.

23. The work vehicle of claim 22, including:
   a third section including:
      a third frame pivotally coupled to the second frame about a second pivot axis; and
      a second set of ground engaging motive members coupled to the third frame.

24. The work vehicle of claim 23, including:
   a fuel tank coupled to the third frame.

* * * * *